Figure 1:
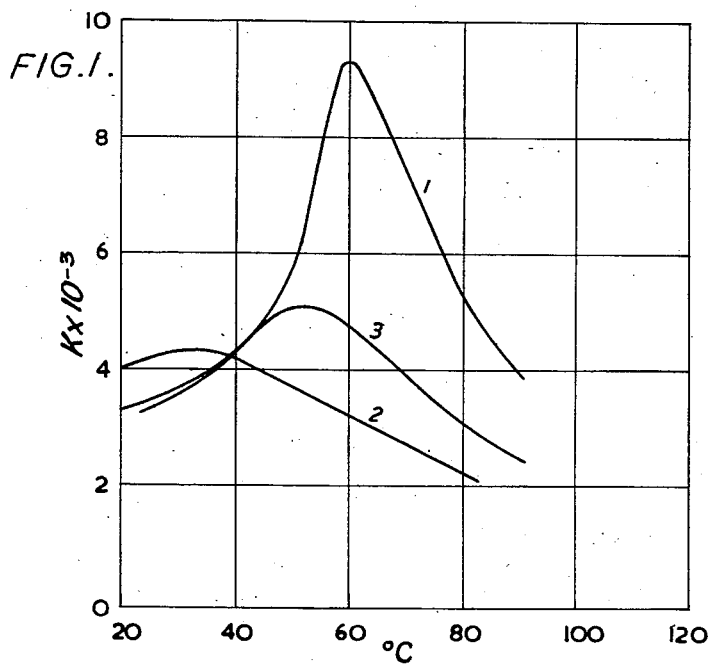

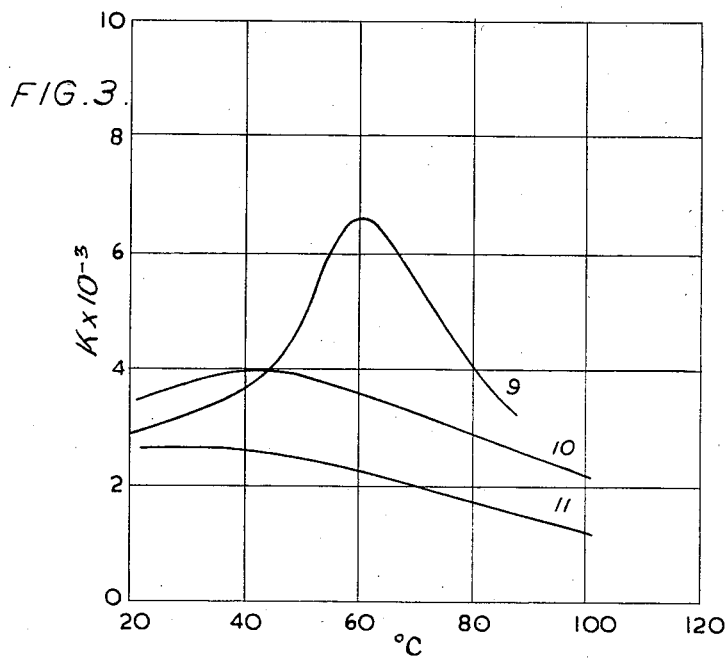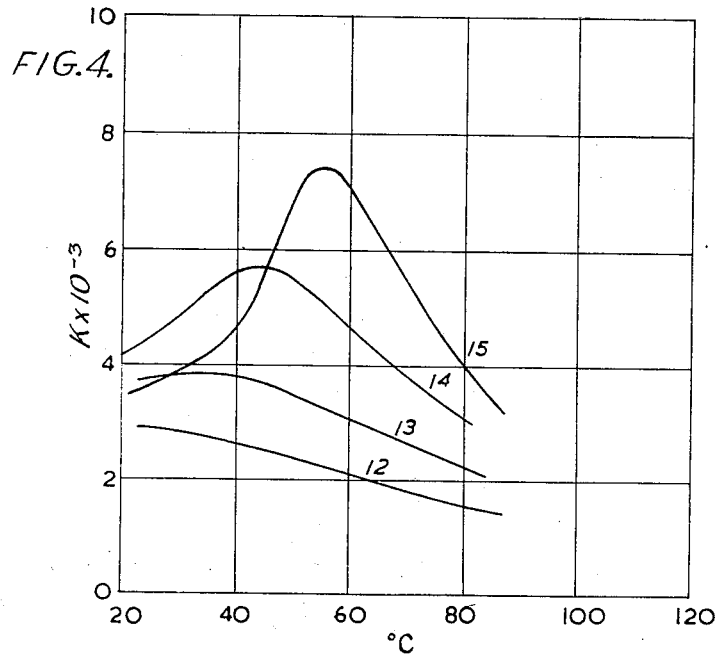

United States Patent Office 2,705,204
Patented Mar. 29, 1955

2,705,204

CERAMIC DIELECTRIC MATERIALS

Tzu En Shen, London, and Karl Wolfgang Plessner, Crowthorne, England, assignors to British Dielectric Research Limited, London, England, a British company Application January 27, 1954, Serial No. 406,452

Claims priority, application Great Britain February 17, 1953

9 Claims. (Cl. 106—39)

This invention relates to barium titanate ceramic dielectric materials containing calcium stannate. The incorporation of calcium stannate in barium titanate ceramics is known to reduce their temperature coefficient of capacitance, at the same time providing a ceramic material having a high dielectric constant. It is the object of the present invention to effect a further reduction in the temperature coefficient of capacitance of barium titanate ceramics and in particular to make the coefficient more nearly constant over the temperature range normally encountered when the ceramic bodies are used in dielectric applications.

In accordance with the invention the proportion of calcium stannate is kept between 2 and 10% of the total weight of barium titanate plus calcium stannate and the ceramic material contains an addition of .6 to 1.6% by weight of calcium oxide calculated on the total weight of barium titanate plus calcium stannate. We prefer to use a composition containing approximately 6% by weight of calcium stannate and .8% by weight of calcium oxide calculated on the weight of calcium stannate plus barium titanate.

The resultant ceramic material will on analysis show as ingredients BaO, $TiO_2$, $SnO_2$ and CaO, the BaO and $TiO_2$ being in substantially stoichiometric proportions, the $SnO_2$ being present in an amount sufficient to form 2–10% of calcium stannate based on the total weight of barium titanate and calcium stannate and the CaO being in excess over the amount required for combination with the $SnO_2$ by an amount which is from .6% to 1.6% of the total weight of the barium titanate and calcium stannate.

The curve showing the variation of dielectric constant of barium titanate (plotted vertically) with temperature (plotted horizontally) has a sharp peak. The addition of calcium stannate tends to cause this peak to occur at a lower temperature the higher the amount of calcium stannate. The addition of calcium oxide in addition to calcium stannate flattens the peak without materially reducing the dielectric constant of the resulting ceramic at temperatures of more than 20° C. below that of the original peak. The proportions of the two additives are so chosen that the peak is shifted to about the middle of the working range of the bodies being manufactured and the amount of calcium oxide is chosen to give the desired flattening of the peak. If a larger proportion of calcium oxide is added, materials with a more constant but lower dielectric constant are obtained.

The preferred method of preparing the ceramic materials is by first preparing barium titanate by firing stoichiometric proportions of titanium dioxide and barium oxide, or a barium compound such as barium carbonate which yields barium oxide on heating, then reducing the barium titanate thus formed to a fine powder, thoroughly mixing the powder with sufficient calcium stannate in powdered form to make up 2–10% of the resulting mixture of calcium stannate and barium titanate and an amount of a calcium compound in powdered form which on heating would yield .6 to 1.6% of calcium oxide based on the weight of the mixture of barium titanate and calcium stannate and finally firing the mixture to form the ceramic body. The prepared calcium compound is the carbonate, other compounds which may be used are the oxalate and hydroxide.

An alternative method of procedure is to mix barium titanate (pre-calcined) with stannic oxide and calcium oxide or a compound (such as calcium carbonate) which yields calcium oxide on heating. When calcium oxide is used it is preferred to carry out the mixing in an inert liquid such as benzene to avoid the chemical reaction which would take place if water were used.

The improvement obtained by the incorporation of the specified amount of calcium oxide decreases as the time taken for the final mixing increases. This mixing will normally be carried out in a ball mill. We have found that the greatest improvement is obtained when the milling time is about six hours, but even when it is increased to 20 hours the resultant body still shows a marked improvement over bodies containing no excess of calcium oxide.

The variation of the dielectric constant with the temperature of fourteen examples of ceramic materials in accordance with the invention and of one material made in accordance with known practice are shown in the accompanying drawings. All of the Figures 1–4 are graphs drawn to the same scale, the vertical scale representing the dielectric constant in thousands (i. e. $K \times 10^{-3}$) and the horizontal scale temperature in degrees centigrade.

In accordance with normal practice small quantities of other materials such as fluxes may be incorporated in the ceramic material but the use of such additions is preferably avoided since they tend to lower the dielectric constant of the resulting ceramic.

The following table sets out the compositions of the fifteen examples. The figure given in the column headed "Composition" under each ingredient is the percentage of this ingredient calculated on the total weight of barium titanate plus calcium stannate.

| Figure | Example | Composition | | | Remarks |
|---|---|---|---|---|---|
| | | $BaTiO_3$ | $CaSnO_3$ | CaO | |
| 1 | 1 | 93 | 7 | | Ball milled for six hours. |
| | 2 | 93 | 7 | 1 | Do. |
| | 3 | 94 | 6 | 0.8 | Do. |
| | 4 | 98 | 2 | 0.6 | Do. |
| | 5 | 98 | 2 | 1.6 | Do. |
| 2 | 6 | 90 | 10 | 0.6 | Do. |
| | 7 | 90 | 10 | 1.6 | Do. |
| | 8 | 94 | 6 | 1 | Do. |
| 3 | 9 | 94 | 6 | 0.6 | Mixed with pestle and mortar. |
| | 10 | 94 | 6 | 0.8 | Do. |
| | 11 | 94 | 6 | 1.6 | Do. |
| | 12 | 93 | 7 | 1 | Ball milled for ½ hour. |
| 4 | 13 | 93 | 7 | 1 | Ball milled for 6 hours. |
| | 14 | 93 | 7 | 1 | Ball milled for 9 hours. |
| | 15 | 93 | 7 | 1 | Ball milled for 20 hours. |

The composition of Example 1 was made by mixing barium titanate (pre-calcined) and calcium stannate (pre-calcined) in a ball mill for 6 hours. The compositions of Examples 2, and 4 to 15 were made from the same materials plus precipitated calcium carbonate. Examples 4 to 8 were ball milled for 6 hours, Examples 12 to 15 were ball milled for ½, 6, 9 and 20 hours respectively and Examples 9 to 11 were mixed on a pestle and mortar.

Example 3 was made by mixing pre-calcined barium titanate, precipitated calcium carbonate and stannic oxide, of ordinary laboratory reagent grade, in a ball mill for 6 hours and firing the mixture without any calcination.

The ball mill used in all cases was of 2 pints capacity, containing a porcelain ball charge of 50 balls, each 0.75" nominal diameter, and 20 balls each of 0.875" nominal diameter. The speed of rotation was approximately 70 revolutions per minute and the charge consisted of 140 gm. of powder and 150 ccs. of water. These milling conditions will hereinafter be referred to as the "conditions specified."

In all cases after mixing the powders were dried, 10% of water was added and 1.25 cm. diameter discs about 1 mm. thick were pressed at approximately 8 tons per square inch (about 1250 kg. per sq. cm.). The discs were fired at temperatures ranging from 1350° C. to 1440° C. and electrodes were applied by conventional silvering processes.

Referring to Figure 1, a comparison between curves 1 and 2 shows the improvement obtained by the addition of 1% of calcium oxide to a barium titanate ceramic material containing 7% by weight of calcium stannate.

Figure 3 shows that similar results are obtained when approximately the same proportions of calcium stannate and calcium oxide are used but a different method of manufacture is employed.

Figure 2:
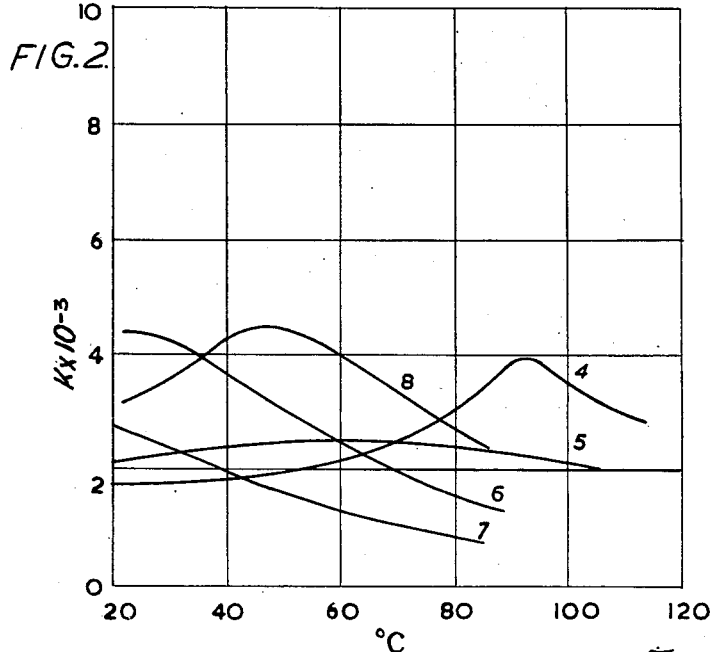

Figure 2 shows the effect of varying the calcium stannate and calcium oxide content between the maximum and minimum limits within the scope of the invention. With the minimum calcium stannate content of 2% and calcium oxide contents of .6 or 1.6% the materials obtained have dielectric constants greater than barium titanate alone and are stable up to 110° C. With the maximum content of calcium stannate of 10% and with a calcium oxide content of .6 or 1.6% the materials obtained have improved temperature coefficients of capacitance over similar materials not containing an excess of calcium oxide and they have comparatively low power factors of .006 and .004 respectively (Examples 6 and 7). Example 8 is a composition in which both the calcium stannate and calcium oxide contents are within the preferred range.

Figure 3 shows that similar results can be obtained by an alternative method of mixing. Again the preferred composition is that in which the calcium oxide content is between the minimum and maximum (see curve 10).

Figure 4 shows the effect of increasing the time of mixing, using a ball mill. The composition of all examples is the same and within the preferred range. Best results are obtained with a milling time of 6 hours (Example 13).

Of the examples described we prefer to use, 2, 8, 10 and 13, that is materials having a calcium stannate content of from 6 or 7% and a calcium oxide content of from .8 to 1%, the ingredients being mixed by ball milling for 6 hours.

What we claim as our invention is:

1. A barium titanate dielectric material having a composition expressed as BaO, TiO$_2$, SnO$_2$ and CaO such that the BaO and TiO$_2$ are in substantially stoichiometric proportions and there is sufficient CaO to combine with all of the SnO$_2$ to give a calcium stannate content of between 2% and 10% by weight and leave an excess of CaO of 0.6% to 1.6% by weight, the percentages being calculated on the total weight of barium titanate and calcium stannate.

2. A barium titanate dielectric material having a composition expressed as BaO, TiO$_2$, SnO$_2$ and CaO such that the BaO and TiO$_2$ are in substantially stoichiometric proportions and there is sufficient CaO to combine with all of the SnO$_2$ to give a calcium stannate content of approximately 6% by weight and leave an excess of CaO of approximately 0.8% by weight, the percentages being calculated on the total weight of barium titanate and calcium stannate.

3. A barium titanate dielectric material having a composition expressed as BaO, TiO$_2$, SnO$_2$ and CaO such that the BaO and TiO$_2$ are in substantially stoichiometric proportions and there is sufficient CaO to combine with all of the SnO$_2$ to give a calcium stannate content of 6–7% by weight and leave an excess of CaO of 0.8–1% by weight, the percentages being calculated on the total weight of barium titanate and calcium stannate.

4. A method of manufacturing a barium titanate dielectric material which comprises mixing powdered barium titanate, powdered calcium stannate and a material selected from the group consisting of powdered calcium oxide and materials which yield calcium oxide on heating and firing the mixture to form a ceramic material, the materials being in appropriate proportions to yield a calcium stannate content of between 2 and 10% by weight and a calcium oxide content of 0.6% to 1.6% by weight, the percentages being calculated on the total weight of barium titanate and calcium stannate.

5. A method of manufacturing a barium titanate dielectric material which comprises mixing powdered barium titanate, powdered calcium stannate and a material selected from the group consisting of powdered calcium oxide and materials which on heating yield calcium oxide in a ball mill for a time not exceeding the equivalent of 20 hours in a two pint capacity mill containing a porcelain ball charge of 50 balls each of 0.75" nominal diameter and 20 balls each of 0.875" nominal diameter the speed of rotation being approximately 70 revolutions per minute and the charge consisting of 140 gm. of powder and 150 ccs. of water and firing the mixture to form a ceramic material, the materials being in appropriate proportions to yield a calcium stannate content of between 2 and 10% by weight and a calcium oxide content of 0.6% to 1.6% by weight, the percentages being calculated on the total weight of barium titanate and calcium stannate.

6. A method of manufacturing a barium titanate dielectric material which comprises mixing powdered barium titanate, stannic oxide and a material selected from the group consisting of powdered calcium oxide and materials which yield calcium oxide on heating and firing the mixture to form a ceramic material, the materials being in appropriate proportions to yield a calcium stannate content of between 2 and 10% by weight and a calcium oxide content of 0.6% to 1.6% by weight, the percentages being calculated on the total weight of barium titanate and calcium stannate.

7. A barium titanate dielectric material containing 2–10% calcium stannate and 0.6%–1.6% by weight of calcium oxide (the percentages being calculated on the total weight of barium titanate and calcium stannate).

8. A barium titanate dielectric material containing approximately 6% by weight of calcium stannate and approximately 0.8% by weight of calcium oxide (the percentages being calculated on the total weight of barium titanate and calcium stannate).

9. A barium titanate dielectric material containing 6–7% by weight of calcium stannate and .8 to 1% by weight of calcium oxide (the percentages being calculated on the total weight of barium titanate and calcium stannate).

No references cited.